United States Patent [19]

Farrington et al.

[11] 4,401,574
[45] Aug. 30, 1983

[54] FLOCCULATION OF AQUEOUS PAINT WASTE

[75] Inventors: Thomas A. Farrington, Sparta; Tamara Nowakowski, Boonton, both of N.J.

[73] Assignee: Drew Chemical Corporation, Boonton, N.J.

[21] Appl. No.: 285,297

[22] Filed: Jul. 21, 1981

[51] Int. Cl.³ ............................................... C02F 1/52
[52] U.S. Cl. .................................. 210/728; 210/908; 210/910
[58] Field of Search ............... 210/716, 908, 910, 917, 210/727, 728

[56] References Cited

U.S. PATENT DOCUMENTS 3,544,476  12/1970  Aiba et al. ............................ 252/175
3,929,666  12/1975  Aiba et al. ........................ 210/716 X
4,067,806   1/1978  Mauceri .............................. 210/728

*Primary Examiner*—Thomas G. Wyse

[57] ABSTRACT

Paint waste water containing dispersed paint solids is clarified by flocculating the solids with a basic poly aluminum chloride having the following structural formula:

$$Al_n(OH)_mCl_{3n-m}$$

wherein n and m are integers and 3n is larger than m, and the basicity is from 30% to 83%.

5 Claims, No Drawings

FLOCCULATION OF AQUEOUS PAINT WASTE

This invention relates to water clarification, and more particularly to clarification of waste water containing dispersed paint solids.

In the production of latex based paints, there are obtained waste water streams which contain dispersed paint solids, with such waste water streams being obtained, for example, by the washing of paint tanks or spills during the production process. In general, it is desirable to clarify the waste water stream to produce a clear supernatant and waste paint solids, with the clear supernatant being reused in the process or discarded.

In general, such waste water streams containing dispersed paint solids are treated with a flocculant, such as a cationic polymer or alum to flocculate the paint solids; however, it has been found that, in many cases, such cationic polymers or alum do not effectively flocculate solids in a paint waste water stream.

In accordance with the present invention, there is provided an improved process for clarifying paint waste water containing dispersed paint solids wherein the paint waste water containing the dispersed paint solids is contacted with an effective flocculating amount of a poly aluminum chloride having the following structural formula to flocculate the dispersed paint solids and provide a clear aqueous supernatant:

$$Al_n(OH)_m Cl_{3n-m}$$

wherein m and n are integers and 3n is larger than m.

More particularly, the poly aluminum chloride is characterized by a basicity expressed as a percentage $(m/3n \times 100)$ of from 30 to 83%.

The poly aluminum chloride is added to the paint waste water containing dispersed paint solids in an effective flocculating amount, and the optimum amount will vary depending upon the chemical nature and solids content of the paint solids dispersed in the water. In most cases, the poly aluminum chloride should be added in an amount which is at least 10 ppm, with the maximum amount generally not exceeding 10,000 ppm; however, as should be apparent, greater amounts could be employed, although in most cases, such greater amounts are not economically justified.

In some cases, in order to improve the size and the settling time of the floc, it is desirable to add a water soluble organic polyelectrolyte to the water containing dispersed paint solids in conjunction with the poly aluminum compound. Such polyelectrolytes are known in the art, and in general are either homopolymers or copolymers of acrylamide. As representative examples of suitable polyelectrolytes, there may be mentioned polyacrylamide and its water soluble copolymeric derivatives such as acrylamide polymerized with acrylic acid, acrylic acid salts, methacrylic acid, methacrylamido propyl trimethyl ammonium chloride, or methacryloyl ethyl trimethyl ammonium chloride. Preferred copolymers are those obtained by the copolymerization of acrylamide with acrylic acid or acrylic acid salts with molar ratios of amide groups to carboxy groups in the resultant copolymer in the range of 95:5 to 70:30.

In using such polyelectrolytes, in general, such polyelectrolytes are added in an amount of at least 1 ppm, and in an amount no greater than 1000 ppm, with such poly electrolytes preferably being employed in an amount of from 5 to 100 ppm. The selection of an optimum amount will again vary with the chemical nature and solids content of the dispersed paint solids, and the selection of such optimum amounts should be apparent to those skilled in the art from the teachings herein.

The water containing the dispersed paint solids is treated with the poly aluminum chloride, and in some cases, with the organic polyelectrolyte, by adding such materials to the water containing the dispersed paint solids, followed by agitation thereof. Such poly aluminum chloride may be added, as such, or may be added in the form of an aqueous solution thereof. The addition of such poly aluminum chloride results in flocculation of the dispersed paint solids and settling thereof to provide a clear aqueous supernatant, which may be easily separated from the flocculated solids.

If desired, the water content of the settled floc (sludge) can be further reduced by filtration or centrifugation.

The water containing dispersed solids includes, as generally known in the art, dispersed pigment, polymer emulsion particles, as well as surface active agents. As known in the art, such polymers which are employed for the production of aqueous latex paints include, but are not limited to, polyvinylacetate, acrylics, copolymers of vinyl acetate with acrylics or vinyl chloride, etc.

Although applicant does not intend to be bound by any theoretical reasoning, it is believed that cationic flocculants and alum, in many cases, are ineffective for treatment of waste water in the paint industry as a result of the presence of non-ionic surfactants which are believed to interfere with the flocculation. Applicant surprisingly found that poly aluminum chloride effectively flocculates the paint wastes in cases where alum or cationic flocculants are relatively ineffective. Thus, the use of poly aluminum chlorides are believed to be particularly suitable to treatment of aqueous paint wastes which include non-ionic surfactants.

The invention will be further described with respect to the following examples; however, the scope of the invention is not to be limited thereby:

GENERAL TEST PROCEDURE FOR FLOCCULATION

Jar tests were performed upon the aqueous latex paint waste in the following manner. Flocculant is added to 500 ml of waste, and the mixture was stirred at 120 rpm for one minute. The agitation speed was then reduced to 60 rpm and stirring was continued for 3 minutes. The treated samples were then left standing for 3 hours. The effectiveness of the treatment was then judged by measuring the supernatant clarity using a Hach turbidimeter. This unit indicates clarity as NTU, nephelometric turbidity units.

EXAMPLE 1

A polyvinylacetate based paint waste containing 10% solids at a pH of 7.5 was treated with 2000 ppm of poly aluminum chloride having a basicity of about 50% (PAC) according to the general test procedure. The supernatant clarity obtained was 50 NTU.

EXAMPLE 2

A paint waste containing 3% solids at a pH of 6.3 was treated with 2000 ppm. of PAC according to the general test procedure. The supernatant clarity obtained was 27 NTU.

EXAMPLE 3

A polyvinylacetate based paint waste containing 5.3% solids at a pH of 7.1 was treated with 1000 ppm. of PAC according to the general test procedure. The supernatant clarity obtained was 35 NTU.

EXAMPLE 4

The waste used in Example 3 was treated with 1000 ppm of PAC and 60 ppm of a polyelectrolyte which is a copolymer of acrylamide and acrylic acid in accordance with the general test procedure. The supernatant had a clarity of 12 NTU.

EXAMPLE 5

A vinyl-acrylic paint waste containing 2% solids and 3% organic solvent at a pH of 9.3 was treated with 4000 ppm of PAC and 60 ppm of the polyelectrolyte of Example 4 according to the general test procedure. The supernatant clarity obtained was 30 NTU.

Thus, the poly aluminum chloride is suitable for clarifying a wide variety of paint wastes having a range of pH values.

In attempting to use conventional paint flocculants, such as alum or cationic polymers; e.g., polyamines, for flocculation of paint wastes, it was found that such flocculants could not be as effectively employed for use with a wide variety of paint wastes over a range of pH values. In some cases, the conventional paint flocculants were effective; however, in others, the conventional paint flocculants were either ineffective or required considerably greater amounts to achieve flocculation. Thus, for example, in attempting to flocculate the paint waste of Example 1 organic cationics (cationic polymers) were ineffective. Alum when used at treatment levels to 3000 ppm produced a clarity of 300 NTU.

A variety of cationic polymers were employed in an attempt to flocculate the paint waste of Example 2 and only one was found to be effective and such cationic required a treatment level of 10,000 ppm.

The present invention is particularly advantageous in that by use of a poly aluminum chloride alone, or in combination with a poly electrolyte, it is possible to provide for clarification of a wide variety of aqueous paint wastes over a wide pH range. The use of the poly aluminum chloride has been found to be effective for clarification of paint wastes which cannot be effectively clarified by flocculants conventionally used for such purposes.

Although poly aluminum chlorides have been previously used for flocculating solids in water (for example, U.S. Pat. No. 3,544,476), it was completely unexpected that poly aluminum chlorides could be effectively used for a wide variety of aqueous paint wastes, particularly where conventional paint waste flocculants do not have such a wide application.

Numerous modifications and variations of the present invention are possible in light of the above teachings and, therefore, within the scope of the appended claims, the invention may be practised otherwise than as particularly described.

We claim:

1. In a process for clarifying latex paint waste water containing dispersed latex paint solids, the improvement comprising:

flocculating the latex paint solids with an effective flocculating amount of a poly aluminum chloride characterized by the following structural formula:

$$Al_n(OH)_mCl_{3n-m}$$

wherein n and m are integers and 3n is greater than m and the basicity as a percentage is from 30% to 83%.

2. The process of claim 1 wherein the poly aluminum chloride is employed in an amount of at least 10 ppm.

3. The process of claim 1 wherein the paint waste includes non-ionic surfactant.

4. The process of claim 1 wherein a polyelectrolyte is also employed to improve flocculation.

5. The process of claim 4 wherein the polyelectrolyte is employed in an amount of at least 1 ppm.

* * * * *